(12) United States Patent
Shinohara (10) Patent No.: US 12,384,043 B2
(45) Date of Patent: Aug. 12, 2025

(54) STATE MONITORING DEVICE AND STATE MONITORING METHOD FOR INDUSTRIAL MACHINERY

(71) Applicant: FANUC CORPORATION, Yamanashi (JP)

(72) Inventor: Naruki Shinohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 18/003,261

(22) PCT Filed: Jul. 1, 2021

(86) PCT No.: PCT/JP2021/024968
§ 371 (c)(1),
(2) Date: Dec. 23, 2022

(87) PCT Pub. No.: WO2022/004847
PCT Pub. Date: Jan. 6, 2022

(65) Prior Publication Data
US 2023/0241779 A1    Aug. 3, 2023

(30) Foreign Application Priority Data
Jul. 3, 2020   (JP) ................................ 2020-115433

(51) Int. Cl.
*B25J 9/16*    (2006.01)
(52) U.S. Cl.
CPC ........... *B25J 9/1697* (2013.01); *B25J 9/1656* (2013.01); *B25J 9/1674* (2013.01)
(58) Field of Classification Search
CPC ....... B25J 9/1697; B25J 9/1656; B25J 9/1674
See application file for complete search history.

(56) References Cited

U.S. PATENT DOCUMENTS

2004/0138783 A1 *   7/2004   Watanabe .............. B25J 9/1674
700/259

FOREIGN PATENT DOCUMENTS

JP    H01-250109 A   10/1989
JP    2004-174662 A   6/2004
(Continued)

OTHER PUBLICATIONS

International Search Report issued in PCT/JP2021/024968; mailed Sep. 28, 2021.

*Primary Examiner* — Thomas E Worden
*Assistant Examiner* — Christopher A Buksa
(74) *Attorney, Agent, or Firm* — Studebaker Brackett PLLC (57) ABSTRACT

A robot state monitoring device 2 comprises: a camera which captures an image of a robot 3 under the control of a controller; a moving image generation unit which associates video data of the robot 3 acquired by the camera with input/output signals DO[1], AO[1], DI[1], and AI[1] of the controller along a time axis 830, and generates a moving image showing a state change of the robot 3 and the input/output signals DO[1], AO[1], DI[1], and AI[1]; and a moving image playback device which plays back the moving image generated by the moving image generation unit The moving image generation unit acquires the values of the input/output signals DO[1], AO[1], DI[1], and AI[1] at the recording time of each frame under the same cycle as the frame rate of the video data.

5 Claims, 5 Drawing Sheets

(56) References Cited

FOREIGN PATENT DOCUMENTS

| | | |
|---|---|---|
| JP | 2006-228029 A | 8/2006 |
| JP | 2015-168016 A | 9/2015 |
| JP | 2019-164470 A | 9/2019 |
| JP | 2020-023024 A | 2/2020 |

* cited by examiner

STATE MONITORING DEVICE AND STATE MONITORING METHOD FOR INDUSTRIAL MACHINERY

TECHNICAL FIELD

The present disclosure relates to a state monitoring apparatus and state monitoring method for an industrial machine.

BACKGROUND ART

A robot system controls a robot using a robot control device, and various kinds of peripheral devices are connected to the robot control device. Such a robot system needs to check the states of input and output signals of the robot control device when the system expands or deals with communication failures between the robot control device and the peripheral devices.

Patent Document 1 discloses a robot monitoring system. This system captures an image of a robot that works under the control of a robot control device using an imaging device, stores image information acquired by the imaging device in association with time information and work content information of the robot, and displays the stored image information together with the time information and the work content information on a display. This robot monitoring system allows an operator to identify a defective part of the robot quickly and easily.

Patent Document 1: Japanese Unexamined Patent Application, Publication No. 2015-168016

DISCLOSURE OF THE INVENTION

Problems to be Solved by the Invention

A technique of monitoring the state of the robot by recording the motions of the robot with the imaging device has been known as described above. Such a known robot monitoring apparatus cannot clarify a correlation between the operating state of the robot and the states of the input and output signals of the robot control device.

In view of the foregoing, the present disclosure has been made to provide a state monitoring apparatus and state monitoring method for an industrial machine that can easily clarify a correlation between the operating state of the industrial machine and a signal state of a controller of the industrial machine along a time axis.

Means for Solving the Problems

An embodiment of the present disclosure is directed to a state monitoring apparatus for an industrial machine. The state monitoring apparatus includes: an imaging device that captures an image of the industrial machine under control of a controller; a video creation unit that associates a video data acquired by the imaging device with an input/output signal, which is at least one of an input or output signal of the controller, along a time axis, thereby creating a video showing a change in state of the industrial machine and a change in state of the input/output signal; and a video player that plays the video created by the video creation unit.

An embodiment of the present disclosure is directed to a state monitoring method for an industrial machine. The state monitoring method includes: capturing an image of the industrial machine under control of a controller using an imaging device; associating a video data acquired by the imaging device with an input/output signal, which is at least one of an input or output signal of the controller, along a time axis, thereby creating a video showing a change in state of the industrial machine and a change in state of the input/output signal; and playing the video on a video player.

Effects of the Invention

According to the embodiment of the present disclosure, a correlation between an operating state of an industrial machine and a state of an input/output signal of a controller of the industrial machine can be easily clarified along a time axis.

PREFERRED MODE FOR CARRYING OUT THE INVENTION

A robot system 1 including a robot state monitoring apparatus 2 according to an embodiment of the present disclosure will be described below with reference to the drawings.

Figure 1:
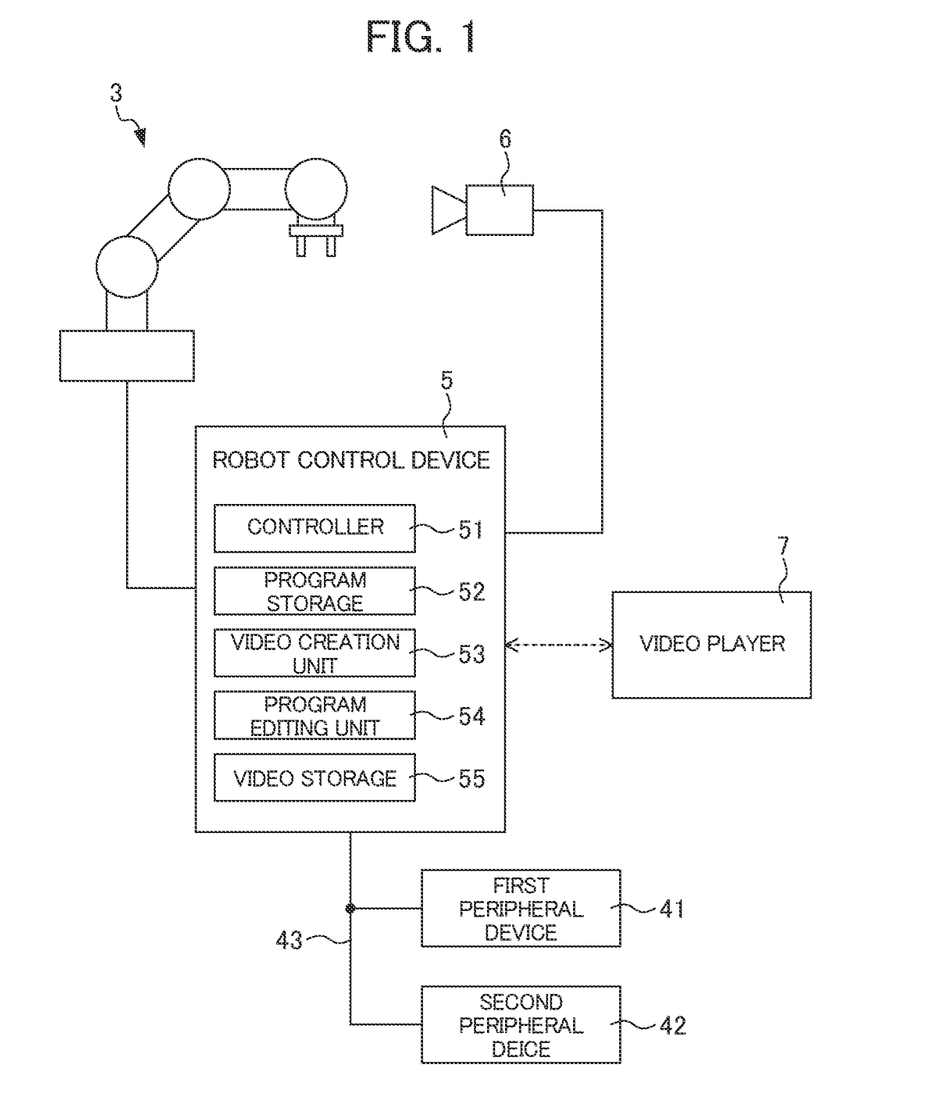
FIG. 1 is a schematic view illustrating a robot system including a robot state monitoring apparatus according to an embodiment of the present disclosure.

FIG. 1 is a schematic view illustrating the robot system 1 including the robot state monitoring apparatus 2 of the present embodiment.

The robot system 1 includes a robot 3 as an industrial machine, a first peripheral device 41, a second peripheral device 42, and the robot state monitoring apparatus 2 that monitors the states of the robot 3 and the peripheral devices 41 and 42.

In the present embodiment, the robot 3 will be described as, for example, a transfer robot that performs a series of transfer actions including holding a workpiece at a predetermined position and transferring the workpiece to a predetermined position in accordance with a control signal transmitted from a controller 51 which will be described later. However, the present disclosure is not limited to this example. The robot 3 may be any robot that works in accordance with the control signal transmitted from the controller 51, such as a welding robot and a coating robot.

The robot state monitoring apparatus 2 includes a robot control device 5 that controls the robot 3, a camera 6 as an imaging device that captures images of the transfer actions of the robot 3, and a video player 7 that plays a video.

The camera 6 is placed near the robot 3. The camera 6 captures images of the transfer actions of the robot 3 under the control of the robot control device 5 at a predetermined frame rate, and transmits the acquired video data of the robot 3 to the robot control device 5.

The robot control device 5 is a computer comprised of various types of hardware, such as a communication means (not shown) that communicates with the peripheral devices 41 and 42 via a communication line 43, a calculation means (not shown) such as a central processing unit (CPU), an auxiliary storage (not shown) such as a hard disk drive (HDD) and a solid state drive (SSD) that store various programs, and a main storage (not shown) such as a random access memory (RAM) that stores data temporarily required for the calculation means to run the programs. The above-described hardware configuration gives the robot control device 5 various functional units, such as the controller 51, a program storage 52, a video creation unit 53, a program editing unit 54, and a video storage 55 as shown in FIG. 1.

The controller 51 exchanges digital and analogue signals with the peripheral devices 41 and 42 via the communication line 43, and controls the robot 3 in accordance with the programs stored in the program storage 52.

The program storage 52 stores programs for setting values of output signals to be outputted from the controller 51 to the robot 3 and the peripheral devices 41 and 42. At least some of the programs stored in the program storage 52 can be edited by the program editing unit 54 which will be described later.

The video creation unit 53 acquires video data of the robot 3 transmitted from the camera 6 and an input/output signal of the controller 51, associates the acquired video data with the input/output signal along a common time axis to create a video (see FIG. 3 described later) showing a change in state of the robot 3 and a change in state of the input/output signal, and then stores the created video in the video storage 55. The input/output signal of the controller 51 acquired by the video creation unit 53 is at least one of a digital input signal (DI[1], DI[2], . . . ), an analog input signal (AI[1], AI[2], . . . ), a digital output signal (DO[1], DO[2], . . . ), or an analog output signal (AO[1], AO[2], . . . ). The digital and analog input signals are inputted from the robot 3 and the peripheral devices 41 and 42 to the controller 51, and the digital and analog output signals are outputted from the controller 51 to the robot 3 and the peripheral devices 41 and 42. In the present embodiment, the digital signal is a binary signal that can be ON or OFF, and the analog signal is a signal that can take any integer value in a predetermined range.

The video player 7 is a mobile communication terminal, such as a tablet, that can communicate with the robot control device 5. The video player 7 plays a video created by the video creation unit 53 and stored in the video storage 55 in accordance with an operation of the operator.

How the video creation unit 53 creates the video will be described below with reference to FIGS. 2A, 2B, and 3.

Figure 2A:
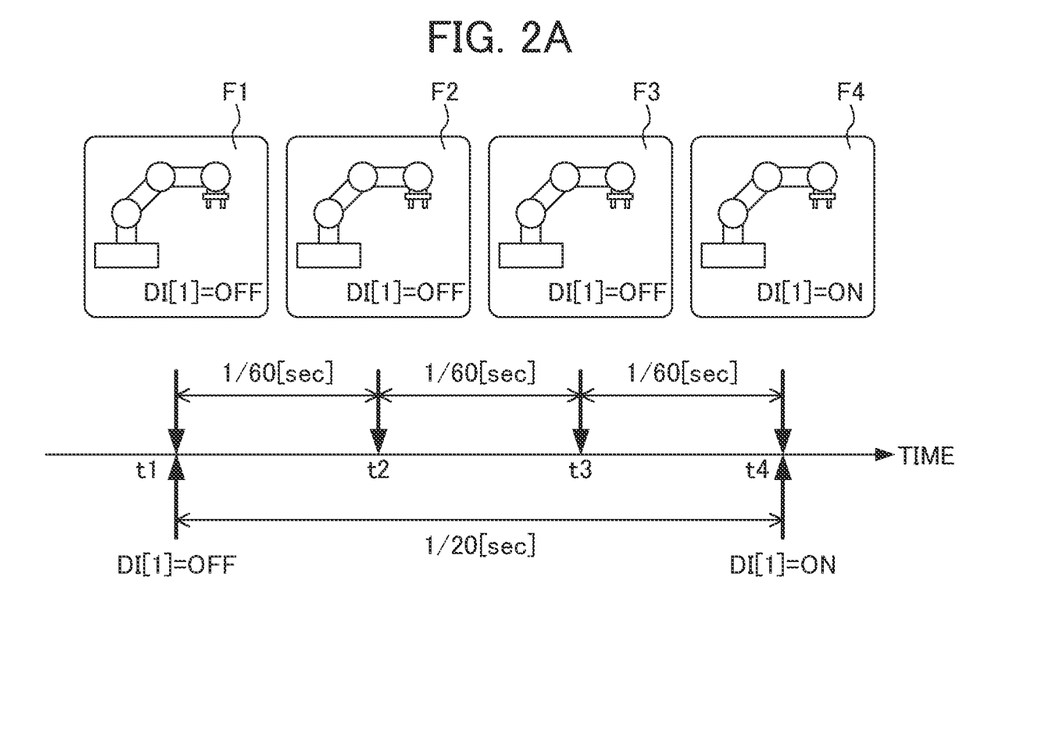
FIG. 2A is a view schematically illustrating a relationship between a frame rate of video data captured by a camera and an update cycle of an input/output signal.
Figure 2B:
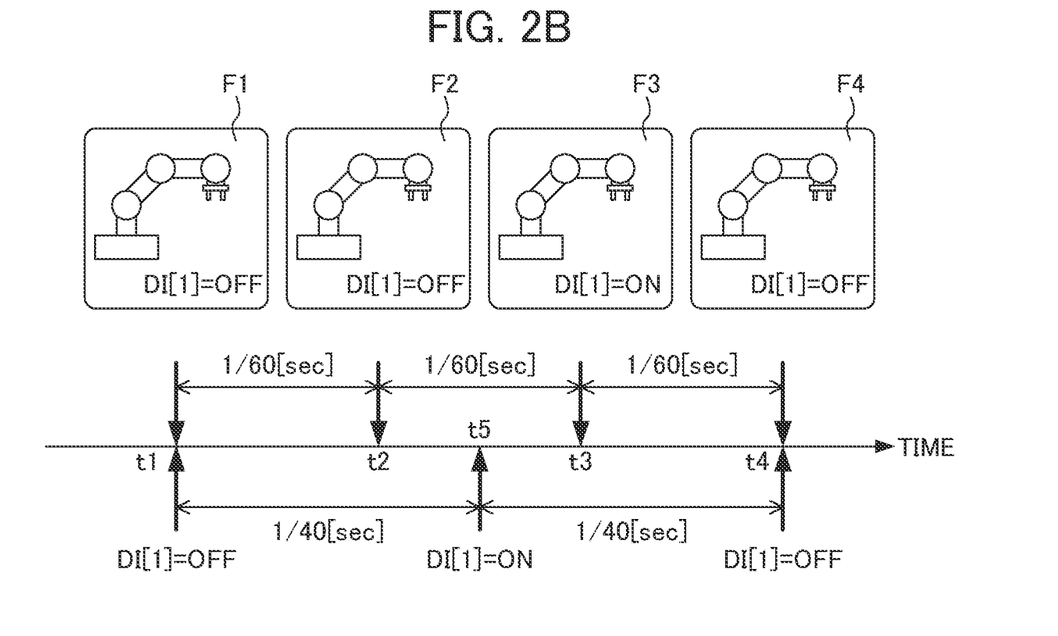
FIG. 2B is a view schematically illustrating a relationship between a frame rate of video data captured by a camera and an update cycle of an input/output signal.

FIGS. 2A and 2B are views schematically illustrating a relationship between a frame rate [fps] of the video data captured by the camera 6 and an update cycle [sec] of the input/output signal. FIGS. 2A and 2B show the digital input signal DI[1] only as the input/output signal acquired by the video creation unit 53. FIGS. 2A and 2B show examples in which the frame rate of the video data is 60 [fps], i.e., frames constituting the video data are each captured every $1/60$ [sec], but the present disclosure is not limited to these examples. The update cycle of the digital input signal DI[1] is $1/20$ [sec] in the example of FIG. 2A, and $1/40$ [sec] in the example of FIG. 2B. However, the present disclosure is not limited to these examples.

As shown in FIGS. 2A and 2B, the video data captured by the camera 6 is constituted of a plurality of frames F1, F2, F3, F4, . . . each captured every $1/60$ [sec], which is a cycle according to the frame rate. Specifically, the frame F1 is captured at time t1, the frame F2 is captured at time t2 which is $1/60$ [sec] after the time t1, the frame F3 is captured at time t3 which is $2/60$ [sec] after the time t1, and the frame F4 is captured at time t4 which is $3/60$ [sec] after the time t1.

Figure 3:
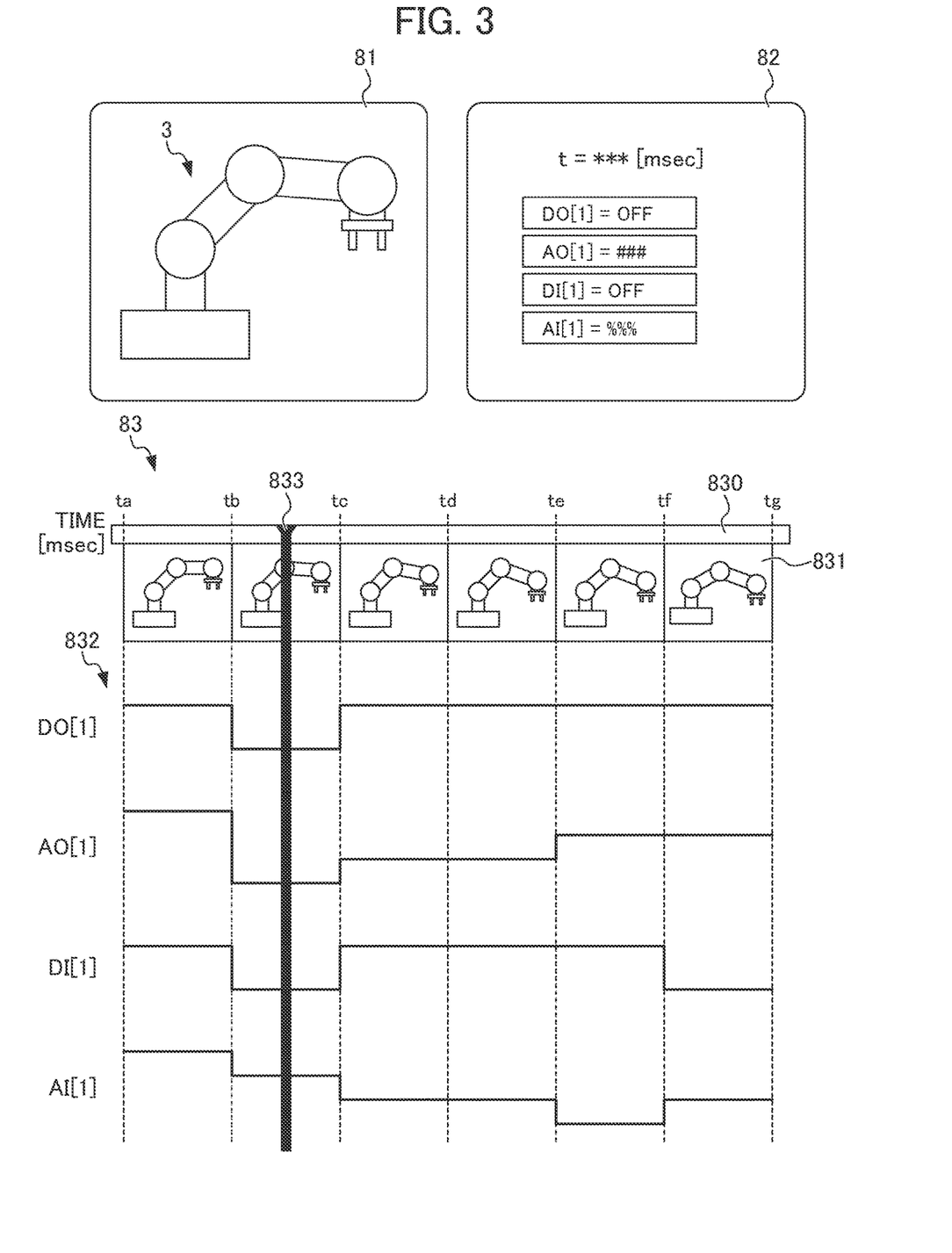
FIG. 3 is a view illustrating an example of a video created by a video creation unit.

The video creation unit 53 acquires values of the digital input signal DI[1] at the times t1 to t4 of recording the frames F1 to F4 in the same cycle as the frame rate of the video data of the camera 6, and associates the video data acquired by the camera 6 with the digital input signal DI[1] along a common time axis, thereby creating a video showing a change in state of the robot 3 and a change in state of the digital input signal DI[1] as shown in FIG. 3.

In the example shown in FIG. 2A, the digital input signal DI[1] is updated every $1/20$ [sec] as described above. Thus, the value of the digital input signal Di[1] that was "OFF" at the time t1 turns to "ON" at the time t4. In this case, the video creation unit 53 acquires "OFF" as the value of the digital input signal DI[1] at the time t1 of recording the frame F1, "OFF" as the value of the digital input signal DI[1] at the time t2 of recording the frame F2, "OFF" as the value of the digital input signal DI[1] at the time t3 of recording the frame F3, and "ON" as the value of the digital input signal DI[1] at the time t4 of recording the frame F4.

In the example shown in FIG. 2B, the digital input signal DI[1] is updated every $1/40$ [sec] as described above. Thus, the value of the digital input signal DI[1] that was "OFF" at the time t1 turns to "ON" at time t5 between the time t2 and the time t3, and then turns to "OFF" at the time t4. In this case, the video creation unit 53 acquires "OFF" as the value of the digital input signal DI[1] at the time t1 of recording the frame F1, "OFF" as the value of the digital input signal DI[1] at the time t2 of recording the frame F2, "ON" as the value of the digital input signal DI[1] at the time t3 of recording the frame F3, and "OFF" as the value of the digital input signal DI[1] at the time t4 of recording the frame F4.

As described above, the video creation unit 53 acquires the values of the digital input/output signal of the controller 51 at the times of recording the frames in the same cycle as the frame rate of the video data of the camera 6. Thus, it is preferable that the inverse of the frame rate (a cycle of taking the frames) of the camera 6 is equal to or less than the update cycle of the input/output signal of the controller 51 so that the video creation unit 53 can acquire all the changes in state of the input/output signal of the controller 51.

FIG. 3 is a view illustrating an example of the video created by the video creation unit 53.

The video creation unit 53 associates the video data of the robot 3 acquired as described above with the input/output signal of the controller 51 along a common time axis to create a video as shown in FIG. 3 including a moving image display field 81 (upper left part of FIG. 3), a signal state display field 82 (upper right part of FIG. 3), and a timeline field 83 (lower part of FIG. 3).

The signal state display field 82 shows a value of time t (will be hereinafter referred to as "current time t") indicated by a time bar 833 described later, and values of the input/output signals selected by the operator at the current time t (the digital output signal DO[1], the analog output signal AO[1], the digital input signal DI[1], and the analog input signal AI[1] are selected in the example of FIG. 3).

The moving image display field 81 shows a moving image of the robot 3 (i.e., continuous playback of still images captured by the camera 6 at a predetermined frame rate). In the example of FIG. 3, still images of the robot 3 at the current time t are shown.

The timeline field 83 shows a time axis 830 extending in a horizontal direction in FIG. 3, a belt-shaped frame bar 831 extending parallel to the time axis 830 under the time axis 830, a time chart field 832 of the input/output signals extending parallel to the time axis 830 under the frame bar 831, and a time bar 833 extending in a vertical direction in FIG. 3 over the time axis 830, the frame bar 831, and the time chart field 832. The current time t corresponds to a coordinate value of the time bar 833 on the time axis 830.

The still images of the robot 3 at the frames (six still images in the example of FIG. 3) are shown in the frame bar 831 along the time axis 830. Specifically, the moving image of the robot 3 shown in the moving image display field 81 is produced by continuous playback of the still images arranged in the frame bar 831 along the time axis 830.

The time chart field 832 shows a time chart image showing the change in value of each of the input/output signals DO[1], AO[1], DI[1], and AI[1] selected by the operator along the time axis 830.

When operating the video player 7, the operator can scroll the time axis 830, the frame bar 831, and the time chart field 832 together in the horizontal direction while the position of time bar 833 is fixed, or can scroll only the time bar 833 in the horizontal direction while the positions of the time axis 830, the frame bar 831, and the time chart field 832 are fixed.

Next, how the program editing unit 54 edits the program stored in the program storage 52 will be described below with reference to FIGS. 4A and 4B. It will be described below that the program editing unit 54 edits, among the programs stored in the program storage 52, a program for setting the value of the digital output signal DO[1] of the controller 51.

Figure 4A:
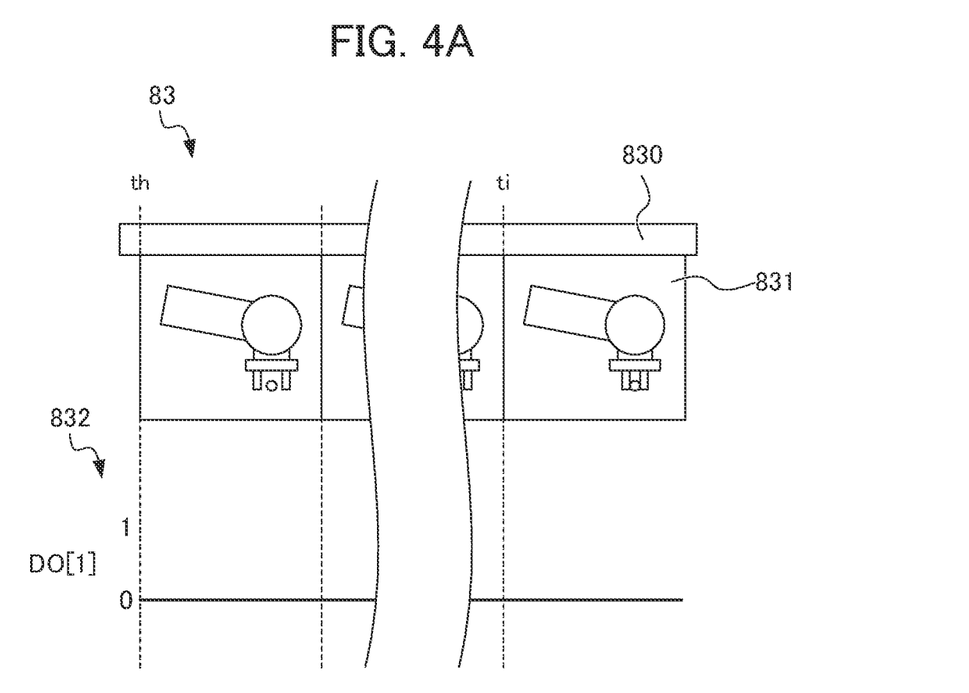
FIG. 4A is a view illustrating an example of a program edition image edited by a program editing unit (before an editing operation by an operator).
Figure 4B:
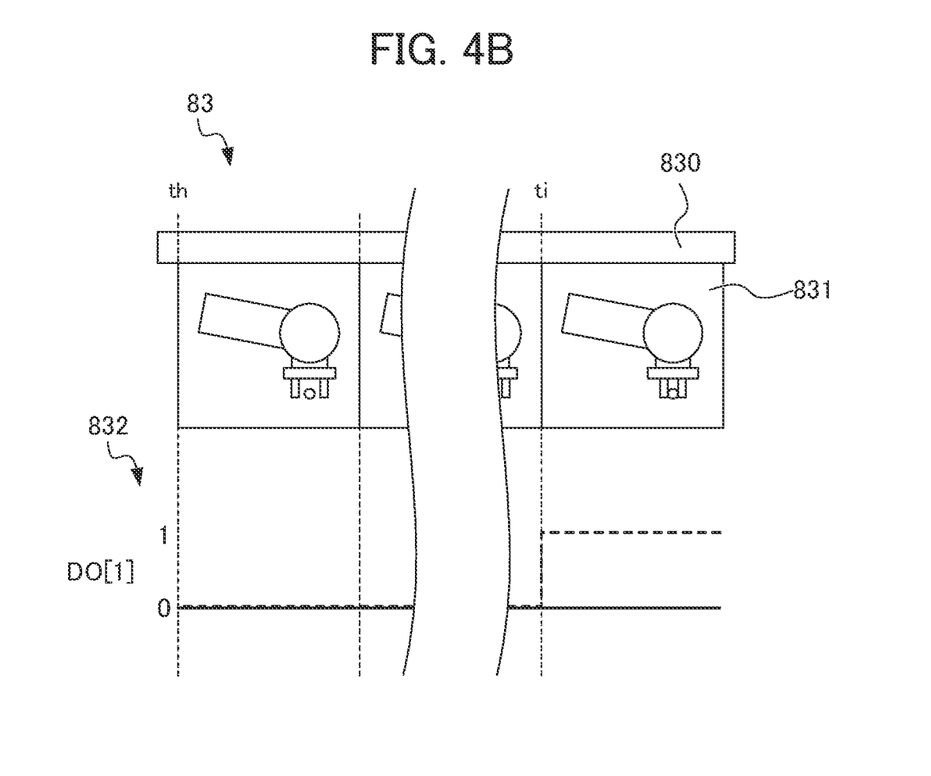
FIG. 4B is a view illustrating an example of a program edition image edited by a program editing unit (after an editing operation by an operator).

When the operator performs a predetermined operation to start editing the program while the video player 7 is playing the created video, the program editing unit 54 stops the video being played, displays a program edition image as shown in FIG. 4A on the video player 7, and shifts to a program editing mode of editing the program for the digital output signal DO[1].

The program editing unit 54 displays the program edition image including at least the timeline field 83 as shown in FIG. 4A on the video player 7. The timeline field 83 in the program edition image includes at least the frame bar 831 showing the still images of the robot 3 at the frames and the time chart field 832 of the digital output signal DO[1] generated by the program that can be edited by the program editing unit 54.

The program editing unit 54 edits a program for setting the value of the digital output signal DO[1] on the program edition image as shown in FIG. 4A in accordance with a predetermined editing operation performed by the operator on the video player 7. The operator can directly change the value of the digital output signal DO[1] on the program edition image. When receiving the editing operation on the program edition image by the operator, the program editing unit 54 edits the program for the digital output signal DO[1] to associate the value of the digital output signal DO[1] changed by the editing operation with the state of the robot 3 shown in the frame bar 831.

An example of how the program editing unit 54 edits the program will be described below with reference to FIG. 4B. FIGS. 4A and 4B show that a hand of the robot 3 is open from time th to ti, and is closed after time ti. In FIG. 4B, a solid line indicates the value of the digital output signal DO[1] generated in accordance with a program not edited by the program editing unit 54, and a dashed line indicates the value of the digital output signal DO[1] changed by the editing operation by the operator. FIG. 4B also shows that the editing operation is done to change the value of the digital output signal DO[1] after time ti from "0" to "1". When the editing operation as shown in FIG. 4B is performed by the operator, the program editing unit 54 edits the program for the digital output signal DO[1] to associate the value of the changed digital output signal DO[1] with the state of the robot 3. Specifically, the program editing unit 54 edits the program for the digital output signal DO[1] so that "0" is outputted while the hand of the robot 3 is open, and "1" is outputted while the hand of the robot 3 is closed. Thus, the program edited by the program editing unit 54 allows the controller 51 to set the value of the digital output signal DO[1] to "0" while the hand of the robot 3 is open, and to "1" while the hand of the robot 3 is closed.

The robot state monitoring apparatus 2 described above monitors the states of the robot 3 and the peripheral devices 41 and 42 in the following steps. First, the camera 6 is used to capture images of the robot 3 under the control of the controller 51. Then, the video creation unit 53 is used to associate the video data acquired by the camera 6 with the input/output signal of the controller 51 along the time axis to create a video showing the change in state of the robot 3 and the change in state of the input/output signal as shown in FIG. 3. The created video is stored in the video storage 55. Then, the video player 7 is used to play the video stored in the video storage 55.

The present embodiment has the following advantages. The robot state monitoring apparatus 2 of the present embodiment includes: the camera 6 that captures an image of the robot 3 under the control of the controller 51; the video creation unit 53 that associates the video data acquired by the camera 6 with the input/output signal of the controller 51 along the common time axis 830, thereby creating a video showing a change in state of the robot 3 and a change in state of the input/output signal; and the video player 7 that plays the video created by the video creation unit 53 and stored in the video storage 55. In the present embodiment, the video described above is created, and the operator can check the operating state of the robot 3 and the state of the input/output signal of the controller 51 simultaneously by just watching the video played by the video player 7. Further, a correlation between the operating state of the robot 3 and the state of the input/output signal of the controller 51 can be easily clarified along the time axis 830.

The video creation unit 53 of the robot state monitoring apparatus 2 of the present embodiment acquires the values of the input/output signal of the controller 51 at the times of recording the frames in the same cycle as the frame rate of the video data acquired by the camera 6. In the present embodiment, the frames are captured at a cycle equal to or faster than the update cycle of the input/output signal. Thus, all the changes in state of the input/output signal of the controller 51 can be acquired.

The video creation unit 53 of the robot state monitoring apparatus 2 of the present embodiment creates a video including: the moving image display field 81 that shows the moving images of the robot 3; and the timeline field 83 including the frame bar 831 showing the still images of the robot 3 in the frames arranged along the time axis 830 and the time chart image of the input/output signal along the time axis 830. In the present embodiment, the video including the moving image display field 81 and the timeline field 83 is created. Thus, the operator can check the operating state of the robot 3 and the state of the input/output signal of the controller 51 simultaneously by just watching the video played by the video player 7. Further, a correlation between the operating state of the robot 3 and the state of the input/output signal of the controller 51 can be easily clarified along the time axis 830.

The program editing unit 54 of the robot state monitoring apparatus 2 of the present embodiment edits the program stored in the program storage 52 based on the editing operation performed by the operator on the program edition image including the timeline field 83. This is convenient for the operator because the operator can edit the program easily and visually in line with the state of the robot 3 shown in the timeline field 83.

The present disclosure is not limited to the above-described embodiment, and can be modified or altered in various ways.

Although the state monitoring apparatus for the industrial machine of the present disclosure is applied to the robot state monitoring apparatus 2 in the present embodiment, the present disclosure is not limited to this apparatus. The state monitoring apparatus of the present disclosure can also be applied to other industrial machines than the robot 3, such as various types of machine tools.

It has been described in the above-described embodiment that the video player 7 is a mobile communication terminal such as a tablet having a communication function and a video display function. However, the video player 7 is not limited to the tablet. The video player 7 may be a mobile teaching device equipped with an operation key that the operator can use to teach the robot 3 to move in a predetermined manner and a display capable of showing a video. This configuration enables the operator to use the teaching device and the video player simultaneously without the inconvenience of swapping the devices.

EXPLANATION OF REFERENCE NUMERALS

1 Robot system
2 Robot state monitoring apparatus (state monitoring apparatus for industrial machine)
3 Robot (industrial machine)
41 First peripheral device
42 Second peripheral device
43 Communication line
5 Robot control device
51 Controller
53 Video creation unit
54 Program editing unit
55 Video storage
6 Camera (imaging device)
7 Video player (video player, teaching device for industrial machine)
81 Moving image display field
82 Signal state display field
83 Timeline field

The invention claimed is:

1. A state monitoring apparatus for an industrial machine, comprising:
   an imaging device that captures an image of the industrial machine under control of a controller;
   a video creation unit that associates a video data acquired by the imaging device with an input/output signal, which is at least one of an input or output signal of the controller, along a time axis, thereby creating a video showing a change in state of the industrial machine and a change in state of the input/output signal; and
   a video player that plays the video created by the video creation unit, wherein the video creation unit
   creates the video including a moving image display field that shows moving images of the industrial machine and a timeline field that shows the time axis, a frame bar extending parallel to the time axis, and a time chart field extending parallel to the time axis and adjacent to the frame bar,
   arranges multiple still images of the industrial machine at each frame along the time axis in the frame bar,
   arranges a time chart image showing the change along the time axis of the input/output signal selected by an operator in the time chart field, and
   arranges a time bar extending orthogonally to the time axis and over the time axis, the frame bar, and the time chart field.

2. The state monitoring apparatus for the industrial machine according to claim 1, wherein the video creation unit acquires values of the input/output signal at times of recording frames in the same cycle as a frame rate of the video data.

3. The state monitoring apparatus for the industrial machine according to claim 1, further comprising:
   a program storage that stores a program for setting a value of the output signal of the controller; and
   a program editing unit that edits the program based on an operation by an operator on an edition image including the timeline field.

4. The state monitoring apparatus for the industrial machine according to claim 1, wherein the video player is a teaching device for the industrial machine.

5. A state monitoring method for an industrial machine, comprising:
   capturing an image of the industrial machine under control of a controller using an imaging device;
   associating a video data acquired by the imaging device with an input/output signal, which is at least one of an input or output signal of the controller, along a time axis, thereby creating a video showing a change in state of the industrial machine and a change in state of the input/output signal;
   creating the video including a moving image display field that shows moving images of the industrial machine and a timeline field that shows the time axis, a frame bar extending parallel to the time axis, and a time chart field extending parallel to the time axis and adjacent to the frame bar;
   arranging multiple still images of the industrial machine at each frame along the time axis in the frame bar;
   arranging a time chart image showing the change along the time axis of the input/output signal selected by an operator in the time chart field;
   arranging a time bar extending orthogonally to the time axis and over the time axis, the frame bar, and the time chart field; and
   playing the video on a video player.

* * * * *